US012680613B2

(12) United States Patent      (10) Patent No.:  US 12,680,613 B2

Moreira      (45) Date of Patent:      Jul. 14, 2026

(54) PISTON RING ASSEMBLY

(71) Applicant: MAHLE International GmbH,
Stuttgart (DE)

(72) Inventor: Rui Moreira, Pacos de Ferreira (PT)

(73) Assignee: Mahle International GmbH (DE)

( * ) Notice: Subject to any disclaimer, the term of this
patent is extended or adjusted under 35
U.S.C. 154(b) by 0 days.

(21) Appl. No.: 18/979,589

(22) Filed: Dec. 12, 2024

(65) Prior Publication Data

US 2025/0198512 A1      Jun. 19, 2025

(51) Int. Cl.
*F16J 9/18*      (2006.01)

(52) U.S. Cl.
CPC ...................................... *F16J 9/18* (2013.01)

(58) Field of Classification Search
CPC ........................................................ F16J 9/18
See application file for complete search history.

(56) References Cited

U.S. PATENT DOCUMENTS

| | | | | | |
|---|---|---|---|---|---|
| 1,092,201 A | * | 4/1914 | Burd | .......................... | F16J 9/14 |
| | | | | | 277/494 |
| 1,187,811 A | * | 6/1916 | Burdick | ..................... | F16J 9/14 |
| | | | | | 277/494 |
| 1,195,279 A | * | 8/1916 | Shierk | ....................... | F16J 9/14 |
| | | | | | 277/494 |
| 1,290,456 A | * | 1/1919 | Wilson | ....................... | F16J 9/14 |
| | | | | | 277/494 |
| 1,377,151 A | * | 5/1921 | Baker | ........................ | F16J 9/14 |
| | | | | | 277/494 |
| 1,999,466 A | | 4/1935 | Leonard | | |
| 2,412,734 A | * | 12/1946 | Iliffe | .......................... | F16J 9/14 |
| | | | | | 277/494 |

FOREIGN PATENT DOCUMENTS

| | | |
|---|---|---|
| DE | 935104 C | 11/1955 |
| EP | 3889471 A1 | 10/2021 |
| JP | 2009085415 A | 4/2009 |

OTHER PUBLICATIONS

English abstract for JP2009 085415.

* cited by examiner

*Primary Examiner* — Vishal A Patel

(74) *Attorney, Agent, or Firm* — Fishman Stewart PLLC

(57)      ABSTRACT

A piston ring assembly is disclosed. The piston ring assembly includes an annular basic body having a gap. A cover element covering the gap of the basic body is provided. The annular basic body having a first end and a second end being arranged adjacent to another separated by the gap. A first recess disposed at the first end and a second recess disposed at the second end such that the first and second recesses leave a respective protrusion at the first end and at the second end. The cover element having a first lateral portion, a middle portion and a second lateral portion. The first and second lateral portions each having a third recess. The cover element is located at basic body such that the middle portion covers the gap and each protrusion is located in a third recess of a lateral portion of the cover element.

19 Claims, 4 Drawing Sheets

PISTON RING ASSEMBLY

CROSS-REFERENCE TO RELATED APPLICATION

This application claims priority to European Patent Application No. EP 23217199.1 filed on Dec. 15, 2023, the contents of which are hereby incorporated by reference in their entirety.

TECHNICAL FIELD

The invention relates to a piston ring assembly, especially for an internal combustion engine designed to use carbon-neutral fuels. The invention further relates to a piston having a piston ring assembly and to an internal combustion engine having a piston with a piston ring assembly.

BACKGROUND

Internal combustion engines have at least one movable piston movably arranged in a cylinder such that the top surface of the piston defines a chamber used for the combustion. As a result of increasing environmental concerns regarding pollutant emissions from internal combustion engines using fossil fuels, several approaches are being studied to minimise their impact. Most of the current internal combustion engines have been optimized to work with fossil fuels like gasoline, natural gas, liquified-petroleum gas and diesel, therefore they are with great environmental impact. New developments are dedicated to carbon-neutral new fuels like hydrogen, whose combustion generates water vapor.

Using a new fuel often requires modifications on an internal combustion engine, so that operation of the internal combustion engine is secure, efficient and durable. Such is the case with hydrogen, which has different properties compared to the fossil fuels like mixture requirements, combustion temperatures and pressures. Two of the main concerns on operating hydrogen in an internal combustion engine are the flow of air/fuel mixture into the crankcase and the presence of lubricating oil inside the combustion chamber.

These conditions are also common with other fuels, as the way they occur are related to the overall geometry of components of the engine. However, these two concerns present bigger issues when the fuel is hydrogen, because hydrogen is flammable with much higher air/fuel concentrations than other fuels such that its presence inside the crankcase has the potential of igniting unexpectedly. Furthermore, oil in the combustion chamber will ignite together with the hydrogen and generate carbon-dioxide and particulate emissions. Additionally, oil vapours inside the combustion chamber change the air/fuel mixture, possibly creating a condition where the engine compression is sufficient to ignite the mixture before the timed spark.

Typically, a piston has multiple grooves for placing annular piston rings that also contact with the cylinder. These rings have a gap that serves a more easy assembly inside the piston groove and providing tension to the ring, so it stays in contact with the cylinder. Therefore, gas is able to flow through the gap. Such effect is called "blow by" having a negative impact on engine efficiency and leading to an unwanted presence of fuel inside the crankcase.

Document EP 3 889 471 A1 discloses a piston ring of an internal combustion engine for ships such that the engine speed is in the range of 200 RPM for a 2-stroke engine and 800 RPM for a 4-stroke engine and the inner diameter of the cylinder is at least 200 mm. The piston ring has a ring section and a lock section having a male locking end and a female locking end interacting with each other. Such piston ring design is not useable for internal combustion engines for automotive applications working at higher engine speeds up to 6000 RPM. Under high engine speed the lock section is not able to keep the female locking end locked to the male locking end and the piston ring will open the lock section allowing a blow-by and most likely damaging the lock section of the piston ring.

SUMMARY

It is the aim of the invention to create a piston ring assembly which is improved compared to the prior of the art. It is also the aim to find a solution that minimises the blow-by and oil film presence inside the combustion chamber of an internal combustion engine improving efficiency of the internal combustion engine and allows a safe operation with hydrogen as fuel. It is furthermore the aim of the invention to create an improved piston and to create an improved internal combustion engine.

The aim concerning the piston ring assembly is solved with the features of the independent claim(s).

One exemplary embodiment of the invention relates to a piston ring assembly comprising an annular basic body having a gap and comprising a cover element covering the gap of the basic body, whereas the annular basic body having a first end and a second end being arranged adjacent to another separated by the gap, the basic body having an radial outer face and a radial inner face, the basic body having a first axial face and a second axial face, whereas the basic body has a first recess at the first end and has a second recess at the second end such that the first and second recesses leave a respective protrusion at the first end and at the second end, whereas the cover element having a first lateral portion, a middle portion and a second lateral portion, the middle portion is located between the lateral portions, the first lateral portion and the second lateral portion each having a third recess, whereas the cover element is located at basic body such that the middle portion of the cover element covers the gap of the basic body and each protrusion of an end of the basic body is located in a third recess of a lateral portion of the cover element. Such a piston ring assembly allows an easy assembly since the basic body is an open ring-shaped component having the gap which is easy to assemble and the cover element covers the gap such that there is no or only very small leakage for fuel such that this design is useful for a combustion engine working with non-fossil fuels like hydrogen and minimises leakage of oil.

According to an embodiment of the invention it is of advantage that the protrusions are protruding in a radial direction from the face of the first recess and from the second recess. This allows a blocking of gases by the protrusions in the axial direction while the protrusions are additionally used to define the position of the cover element and to hold it in place even at high engine speeds.

According to another embodiment of the invention it is of advantage that the radial outer face of the protrusions are aligned with the radial outer face of the annular basic body. This leads to the fact that the protrusions have the same function in contact with the inner wall of a cylinder of an internal combustion engine but having an additional function with respect to the positioning of the cover element and to hold it in place even at high engine speeds.

According to another embodiment of the invention it is of advantage that the radial depth of the first recess at the first end and of the second recess at the second end of the annular basic body is smaller than the radial depth of the basic body, especially less than half of the radial depth of the basic body. This allows a sufficient stability of the basic body and of the cover element even at high engine speed.

According to another embodiment of the invention it is of advantage that the shape of the first recess at the first end and of the second recess at the second end is c-shaped each defining an upper leg and a lower leg extending in circumferential direction and a middle leg extending in axial direction leaving the protrusions between the upper leg and the lower leg. This design allows a safe connection between the basic body and the cover element holding the cover element in place covering the gap of the basic body and allowing an additional labyrinth type sealing between the basic body and the cover element at the radial outer surface minimising blow-by.

According to another embodiment of the invention it is of advantage that the distance between the two protrusions is wider than the width of the gap and the middle portion of the cover element is located between the protrusions. This feature allows a safe covering of the gap by the cover element minimising blow-by through the gap.

According to another embodiment of the invention it is of advantage that the cover element is H-shaped with the middle portion and the first lateral portion and the second lateral portion each having the third recess. This design allows a safe connection between the basic body and the cover element holding the cover element in place covering the gap of the basic body and allowing an additional labyrinth type sealing between the basic body and the cover element on both lateral sides at the radial outer surface further minimising blow-by.

According to another embodiment of the invention it is of advantage that the first recess at the first end and the second recess at the second end create surfaces being planar, cylindrical, conical or combinations of these. This feature allows a better fitting between the basic body and the cover element and allows a more easy manufacture of the two components.

The aim concerning the piston is solved with the features of the independent claim(s).

One exemplary embodiment of the invention relates to a piston of an internal combustion engine having an almost cylindrical piston body having at least one circumferential groove on the radial outer surface of the piston body and at least one piston ring assembly being arranged in at least one of the grooves whereas the piston ring assembly resembling features according to the inventive piston ring assembly.

The aim concerning the internal combustion engine is solved with the features of the independent claim(s).

One exemplary embodiment of the invention relates to an internal combustion engine having at least one inventive piston.

Further advantageous designs are described by the following description of the figures and by the dependent claims.

In the following, the invention will be further explained based on several example embodiments using the drawing figures.

DETAILED DESCRIPTION

Figure 1:
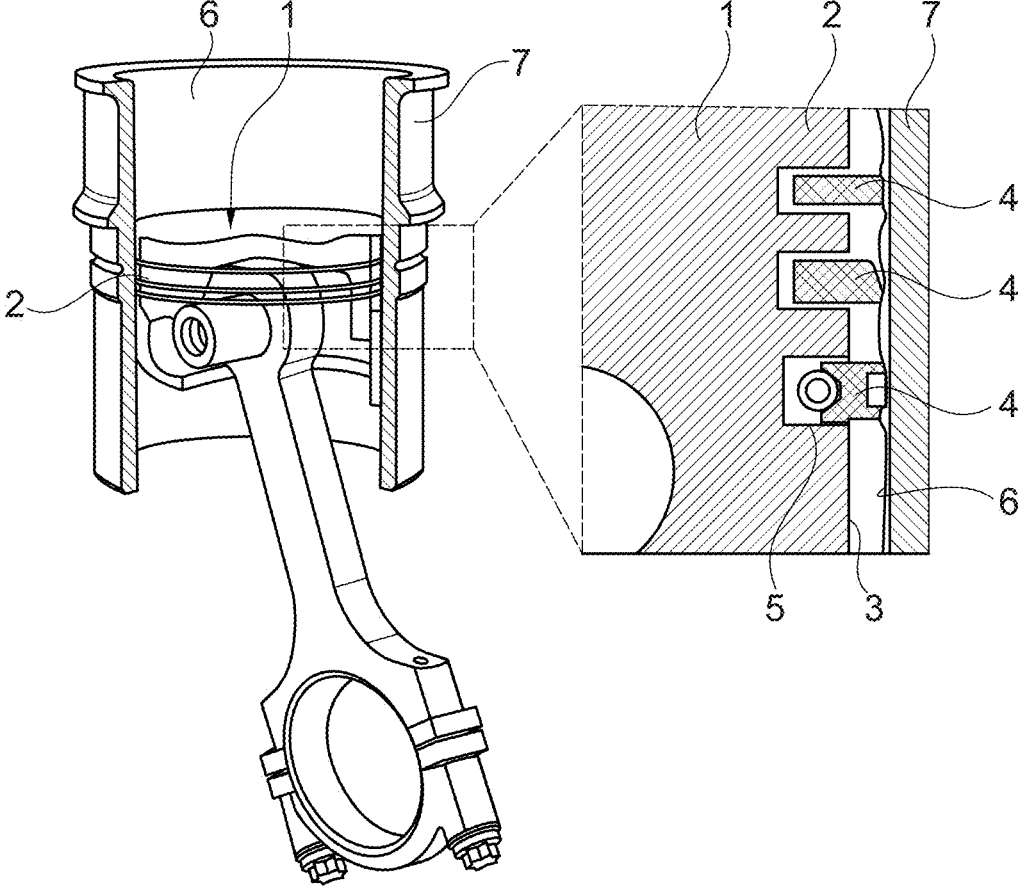
FIG. 1 is a perspective representation of a piston of an internal combustion engine having piston rings arranged according to the prior art to explain the background of the inventive piston ring assembly.

FIG. 1 shows a piston 1 according to the prior art having a piston body 2 having a radial outer face 3 in which grooves 5 are provided at different axial positions. In the grooves 5 piston rings 4 are arranged to touch the inner face 6 of the cylinder 7 in which the piston 1 is arranged. Such piston rings 4 have typically a gap for better assembling of the piston ring 4 within the groove 5 which causes unwanted blow-by and oil leakage.

Figure 6:
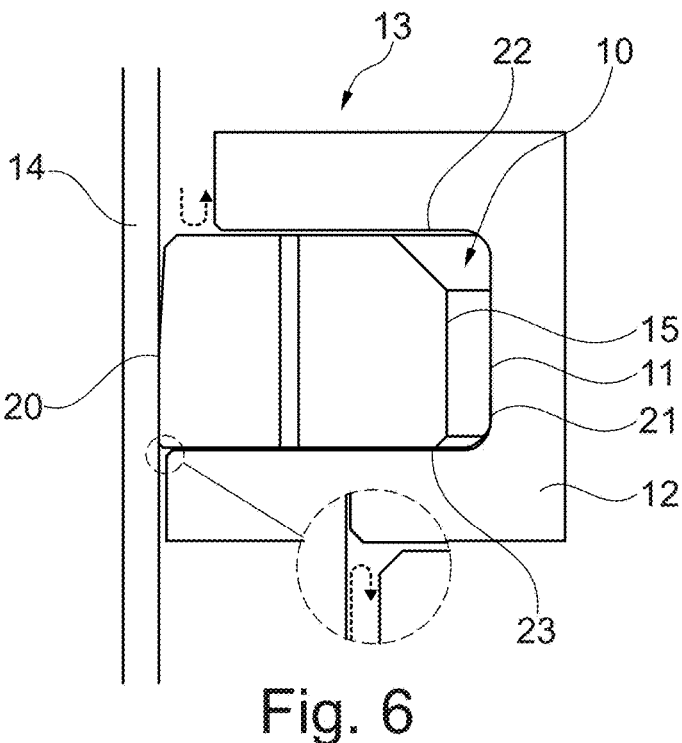
FIG. 6 is a sectional view of the piston ring assembly according to the embodiment of the invention arranged in a groove of a piston.

FIGS. 2 to 8 show different representations of a piston ring assembly 10 according to an embodiment of the invention for being arranged in a groove 11 of a piston 12 of an internal combustion engine 13, see FIG. 6. The piston 12 is arranged in a cylinder 14 of the internal combustion engine 13 for a reciprocating movement of the piston 12 within the cylinder 14.

The inventive piston ring assembly 10 shall prevent or minimise the blow-by of gases and leakage of oil compared to a standard piston ring 4 having an open gap.

Figure 2:
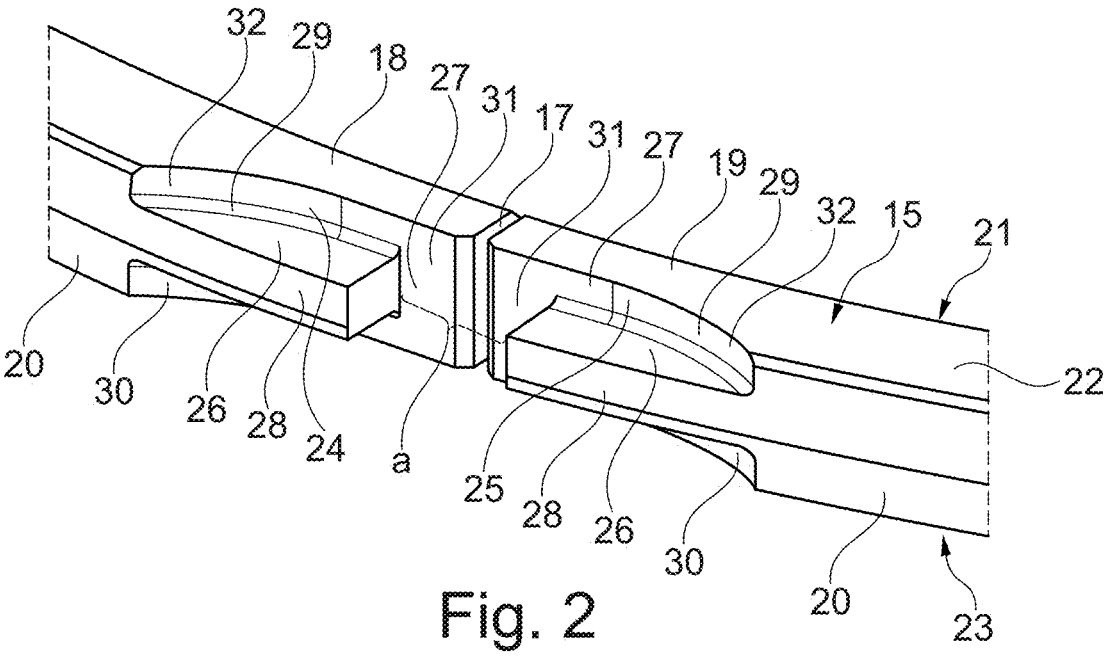
FIG. 2 is a perspective partial representation of a basic body of a piston ring assembly according to an embodiment of the invention.
Figure 3:
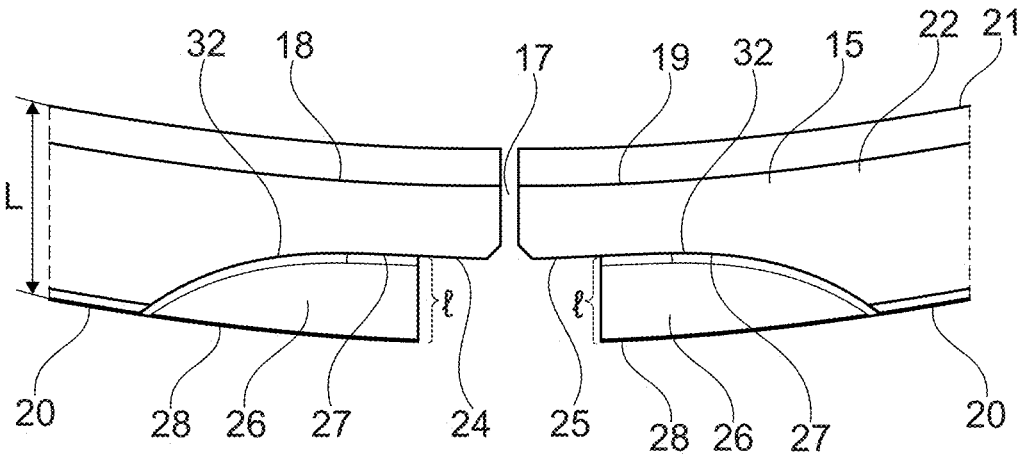
FIG. 3 is a partial top view of the basic body according to FIG. 2.

The piston ring assembly 10 according to the embodiment of the invention comprises an annular basic body 15 according to the FIGS. 2, 3 and 6 and a cover element 16 according to the FIGS. 4 to 8. The piston ring assembly 10 comprises only two components according to this embodiment. It may have further components not shown.

The annular basic body 15 of the piston ring assembly 10 has a gap 17 allowing the basic body 15 to have an open ring-shaped structure which allows an easy assembly of the basic body 15 in the groove 11 of the piston 12.

The cover element 16 is designed and arranged to cover the gap 17 of the basic body 15.

According to the FIGS. 1, 2, 7 and 8 the annular basic body 15 has a first end 18 and a second end 19 and the two ends 18, 19 are arranged adjacent to another separated by the gap 17.

The basic body 15 furthermore has a radial outer face 20 and a radial inner face 21 and the basic body 15 has a first axial face 22 and a second axial face 23 defining the basic body 15 as an annular basic body 15.

As can be seen e.g. in FIGS. 2 and 3 the basic body 15 has a first recess 24 at the first end 18 and the basic body 15 has a second recess 25 at the second end 19 such that the first and second recesses 24, 25 leave a respective protrusion 26 at the first end 18 and at the second end 19.

The protrusions 26 are connected to the part of the basic body 15 being made without the recesses 24, 25 such that the protrusions 26 look like to grow in a circumferential direction from that part being made without recesses 24, 25 to the ends 18, 19 having the recesses 24, 25.

The protrusions 26 are protruding in a radial direction from the face 27 of the first recess 24 and from the second recess 25. The radial outer face 28 of the protrusions 26 are aligned with the radial outer face 20 of the annular basic body 15 to define the outer face of the basic body 15 to contact the inner face 21 of the cylinder 14 of an internal combustion engine 13.

The radial depth 1 of the first recess 24 at the first end 18 and of the second recess 25 at the second end 19 of the annular basic body 15 is smaller than the radial depth L of the basic body 15, especially less than half of the radial depth L of the basic body 15. Therefore, the stability of the basic body 15 is ensured.

As can be seen in FIG. 2 the shape of the first recess 24 at the first end 18 and of the second recess 25 at the second end 19 is at least almost c-shaped each defining an upper leg 29 and a lower leg 30 extending in circumferential direction and a middle leg 31 extending in axial direction leaving the protrusions 26 between the upper leg 29 and the lower leg 30.

The first recess 24 at the first end 18 and the second recess 25 at the second end 19 create surfaces 32 being planar, cylindrical, conical or combinations of these.

The distance a between the two protrusions 26 is wider than the width of the gap a. This distance a equals to the width of the gap plus the width of the middle leg 31 of the first end 18 plus the width of the middle leg 31 of the second end 19.

The width of the middle leg 31 of the first end 18 is preferably identical to the width of the middle leg 31 of the second end 19. According to another embodiment the width of the middle leg 31 of the first end 18 might not be identical to the width of the middle leg 31 of the second end 19.

The cover element 16 having a first lateral portion 33, a middle portion 34 and a second lateral portion 35. The middle portion 34 is located between the lateral portions 33, 35.

Figure 4:
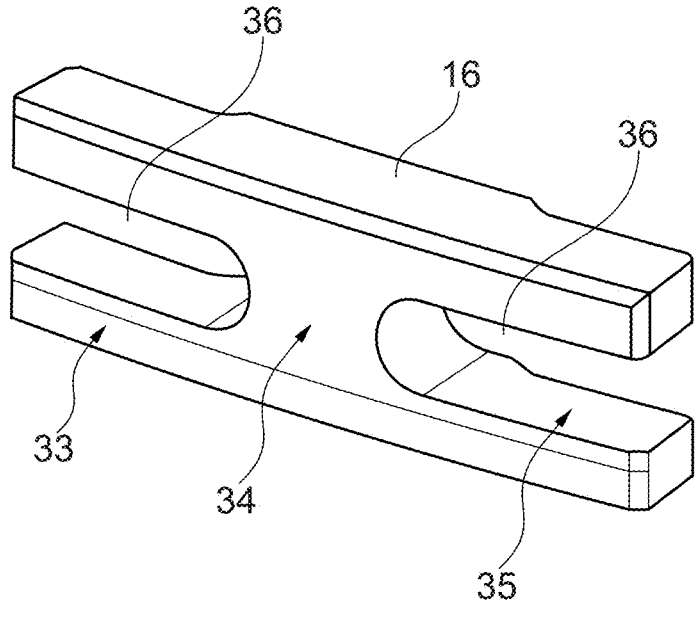
FIG. 4 is a perspective representation of a cover element of a piston ring assembly according to the embodiment of the invention.
Figure 5:
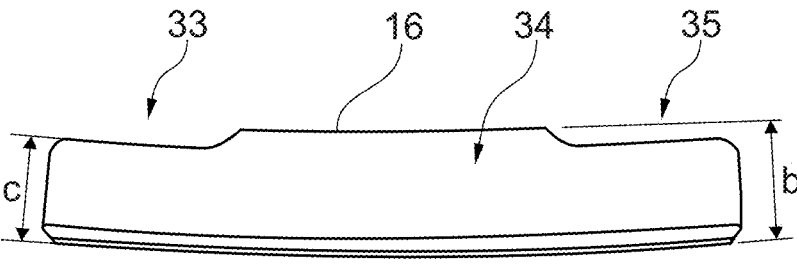
FIG. 5 is a top view of the cover element according to FIG. 4.

As can be seen from FIG. 4 the first lateral portion 33 and the second lateral portion 35 each having a third recess 36.

Figure 7:
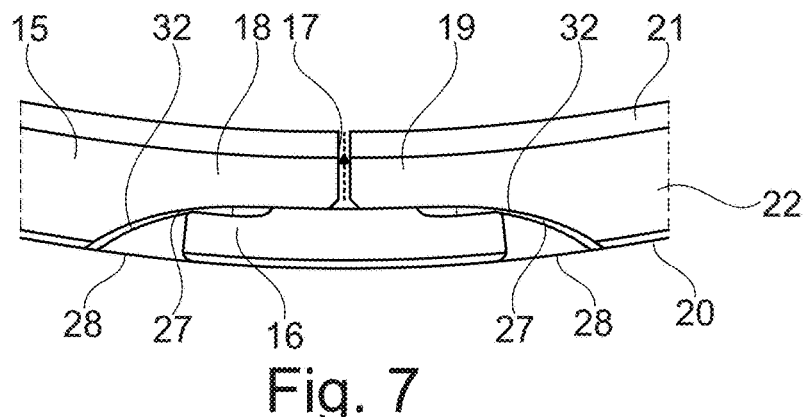
FIG. 7 is a top view of a piston ring assembly according to the embodiment of the invention.
Figure 8:
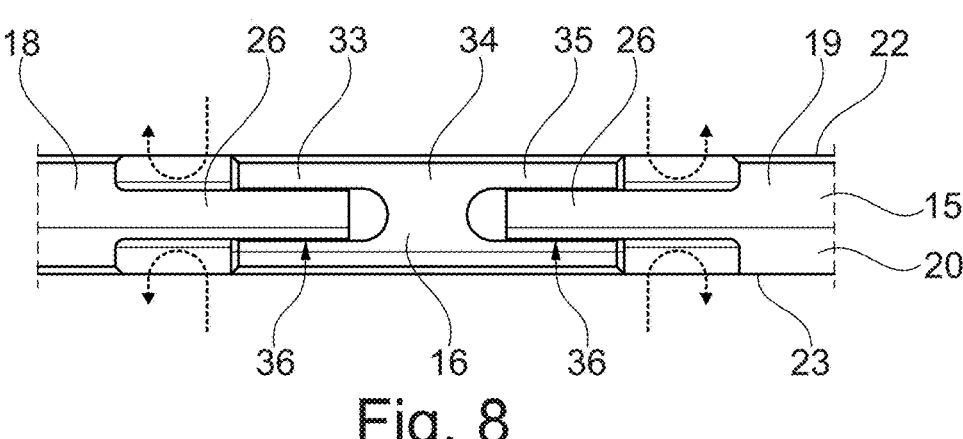
FIG. 8 is a side view of the piston ring assembly according to the embodiment of the invention according to FIG. 7.

In an assembled state, see e.g. FIGS. 6 to 8, the cover element 16 is located at the basic body 15 such that the middle portion 34 of the cover element 16 covers the gap 17 of the basic body 15 and each protrusion 26 of an end 18, 19 of the basic body 15 is located in a third recess 36 of a lateral portion 33, 35 of the cover element 16.

The cover element 16 is H-shaped with the middle portion 34 and the first lateral portion 33 and the second lateral portion 35 each having a third recess 36. In an assembled state the middle portion 34 of the cover element 16 is located between the protrusions 26. The radial extension b of the middle portion 34 is wider than the radial extension c of the lateral portions 33, 35.

According to FIG. 6 the piston ring assembly 10 is arranged in the groove 11 of the piston 12 such that the basic body 15 and part of the cover element 16 are located within the groove 11 overlapping with the boundary of the groove 11 to create a labyrinth-type sealing between the piston ring assembly 10 and the groove 11. The radial outer face 20 of the basic body 15 and of the cover element 16 is in contact with the inner surface of the cylinder 14, so called as side wall, or almost in contact with it.

The piston ring assembly 10 is made from a base material based on steel with a chromium composition between 10% and 18%, cast iron or a polymer.

Furthermore, the piston ring assembly 10 might be made such that at least one surface of each component of the basic body 15 and the cover element 16 having a surface hardening layer with higher hardness than the base material.

Such hardening layer might be a gas nitride layer.

Furthermore, a surface coating applied by PVD (Physical Vapor Deposition) might be provided. Said coating might have a thickness between 6 μm and 60 μm.

The surface hardening might be a DLC coating with a thickness between 3 μm and 60 μm.

From a manufacturing point of view a method of manufacturing the basic body 15 might be such that the gap 17 in the axial direction and/or the axial recesses 24, 25 are machined.

A method for manufacturing the basic body 15 and/or the cover element 16 might be manufactured by bending a wire and then cutting the wire in small portions with the required perimeter.

List of Reference Numerals

1 piston
2 piston body
3 radial outer face
4 piston ring
5 groove
6 inner face
7 cylinder
10 piston ring assembly
11 groove
12 piston
13 internal combustion engine
14 cylinder
15 basic body
16 cover element
17 gap
18 first end
19 second end
20 radial outer face
21 radial inner face
22 first axial face
23 second axial face
24 first recess
25 second recess
26 protrusion
27 face
28 radial outer face
29 upper leg
30 lower leg
31 middle leg
32 surface
33 first lateral portion
34 middle portion
35 second lateral portion
36 third recess

The invention claimed is:

1. A piston ring assembly, comprising:

an annular basic body having a gap;

a cover element covering the gap of the annular basic body;

the annular basic body having a first end and a second end being arranged adjacent to another separated by the gap, the basic body having a radial outer face and a radial inner face, the basic body having a first axial face and a second axial face, wherein the basic body has a first recess at the first end and has a second recess at the second end such that the first and second recesses leave a respective protrusion at the first end and at the second end, wherein the first and second recesses are on the radial outer face;

the cover element having a first lateral portion, a middle portion and a second lateral portion, the middle portion located between the first and second lateral portions, the first lateral portion and the second lateral portion each having a third recess;

wherein the cover element is located at basic body such that the middle portion of the cover element covers the gap of the basic body and each respective protrusion of the first end and the second end of the basic body is located in the respective third recess of the first and second lateral portion of the cover element; and wherein a shape of the first recess at the first end and of the second recess at the second end is c-shaped each defining an upper leg and a lower leg extending in a circumferential direction and a middle leg extending in an axial direction leaving the respective protrusions between the upper leg and the lower leg with the middle leg between the respective protrusion and a corresponding one of the first end and the second end.

2. The piston ring assembly according to claim 1, wherein the respective protrusions protrude in a radial direction from a face of the first recess and from the second recess.

3. The piston ring assembly according to claim 1, wherein the radial outer face of the respective protrusions are aligned with the radial outer face of the annular basic body.

4. The piston ring assembly according to claim 1, wherein a radial depth of the first recess at the first end and of the second recess at the second end of the annular basic body is smaller than a radial depth of the basic body.

5. The piston ring assembly according to claim 1, wherein the radial inner face of the basic body in the first recess at the first end and in the second recess at the second end is aligned with the radial inner face of the basic body outside of the first recess and the second recess.

6. The piston ring assembly according to claim 1, wherein a distance between the respective protrusions as measured between corresponding ends of the respective protrusions is wider than a width of the gap as measured between the first end and the second end of the basic body, and wherein the middle portion of the cover element is located between the respective protrusions.

7. The piston ring assembly according to claim 1, wherein the cover element is H-shaped with the middle portion and the first lateral portion and the second lateral portion each having the third recess.

8. The piston ring assembly according to claim 1, wherein the first recess at the first end and the second recess at the second end provides surfaces being planar, cylindrical, conical or combinations thereof.

9. A piston of an internal combustion engine, comprising:

a piston body having at least one circumferential groove and at least one piston ring assembly arranged in the at least one circumferential groove, the at least one piston ring assembly including:

an annular basic body having a gap;

a cover element covering the gap of the annular basic body;

the annular basic body having a first end and a second end being arranged adjacent to another separated by the gap, the basic body having a radial outer face and a radial inner face, the basic body having a first axial face and a second axial face, wherein the basic body has a first recess at the first end and has a second recess at the second end such that the first and second recesses leave a respective protrusion at the first end and at the second end, and wherein a distance between the respective protrusions as measured between corresponding ends of the respective protrusions is greater than a width of the gap as measured between the first end and the second end of the basic body, wherein the first and second recesses are on the radial outer face;

the cover element having a first lateral portion, a middle portion and a second lateral portion, the middle portion located between the first and second lateral portions, the first lateral portion and the second lateral portion each having a third recess;

wherein the cover element is located at basic body such that the middle portion of the cover element covers the gap of the basic body and each respective protrusion of the first end and the second end of the basic body is located in the respective third recess of the first and second lateral portion of the cover element; and wherein a shape of the first recess at the first end and of the second recess at the second end is c-shaped each defining an upper leg and a lower leg extending in a circumferential direction and a middle leg extending in an axial direction leaving the respective protrusions between the upper leg and the lower leg with the middle leg between the respective protrusion and a corresponding one of the first end and the second end.

10. An internal combustion engine, comprising: at least one piston, the at least one piston including:

a piston body having at least one circumferential groove and at least one piston ring assembly arranged in the at least one circumferential groove, the at least one piston ring assembly including: an annular basic body having a gap; a cover element covering the gap of the annular basic body; the annular basic body having a first end and a second end being arranged adjacent to another separated by the gap, the basic body having a radial outer face and a radial inner face, the basic body having a first axial face and a second axial face, wherein the basic body has a first recess at the first end and has a second recess at the second end such that the first and second recesses leave a respective protrusion at the first end and at the second end; the cover element having a first lateral portion, a middle portion and a second lateral portion, the middle portion located between the first and second lateral portions, the first lateral portion and the second lateral portion each having a third recess; wherein the cover element is located at basic body such that the middle portion of the cover element covers the gap of the basic body and each respective protrusion of the first end and the second end of the basic body is located in the respective third recess of the first and second lateral portion of the cover element; and wherein a shape of the first recess at the first end and of the second recess at the second end is c-shaped each defining an upper leg and a lower leg extending in a circumferential direction and a middle leg extending in an axial direction leaving the respective protrusions between the upper leg and the lower leg with the middle leg between the respective protrusion and a corresponding one of the first end and the second end.

11. The internal combustion engine according to claim 10, wherein the respective protrusions protrude in a radial direction from a face of the first recess and from the second recess.

12. The internal combustion engine according to claim 10, wherein the radial outer face of the respective protrusions are aligned with the radial outer face of the annular basic body.

13. The internal combustion engine according to claim 10, wherein a radial depth of the first recess at the first end and of the second recess at the second end of the annular basic body is smaller than a radial depth of the basic body.

14. The internal combustion engine according to claim 13, wherein the radial depth of the first recess and the second recess is less than half of the radial depth of the basic body.

15. The internal combustion engine according to claim 10, wherein the radial inner face of the basic body in the first recess at the first end and in the second recess at the second end is aligned with the radial inner face of the basic body outside of the first recess and the second recess.

16. The internal combustion engine according to claim 10, wherein a distance between the respective protrusions as measured between corresponding ends of the respective protrusions is wider than a width of the gap as measured between the first end and the second end of the basic body, and wherein the middle portion of the cover element is located between the respective protrusions.

17. The internal combustion engine according to claim 10, wherein the cover element is H-shaped with the middle portion and the first lateral portion and the second lateral portion each having the third recess.

18. The internal combustion engine according to claim 10, wherein the first recess at the first end and the second recess at the second end provides surfaces being planar, cylindrical, conical or combinations thereof.

19. The piston according to claim 9, wherein at least one of:

the middle portion of the cover element is located between the respective protrusions; and the radial outer face of the respective protrusions are aligned with the radial outer face of the annular basic body.

\* \* \* \* \*